United States Patent
Alvanos et al.

(10) Patent No.: US 7,534,088 B1
(45) Date of Patent: May 19, 2009

(54) FLUID INJECTION SYSTEM

(75) Inventors: Ioannis Alvanos, West Springfield, MA (US); Joel H. Wagner, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 401 days.

(21) Appl. No.: 11/455,882

(22) Filed: Jun. 19, 2006

(51) Int. Cl.
*F01D 5/08* (2006.01)
(52) U.S. Cl. .................................. 416/97 R; 415/115
(58) Field of Classification Search ................ 415/116, 415/115; 416/96 R, 97 R
See application file for complete search history.

(56) References Cited

U.S. PATENT DOCUMENTS

| | | | |
|---|---|---|---|
| 2,603,453 A | 7/1952 | Sollinger | |
| 3,565,545 A | 2/1971 | Bobo et al. | |
| 3,609,057 A | 9/1971 | Radtke | |
| 3,628,880 A | 12/1971 | Smuland et al. | |
| 3,670,497 A | 6/1972 | Sheldon | |
| 3,742,705 A | 7/1973 | Sifford | |
| 3,965,066 A | 6/1976 | Sterman et al. | |
| 4,311,431 A | 1/1982 | Barbeau | |
| 4,353,679 A * | 10/1982 | Hauser | 415/115 |
| 4,712,979 A * | 12/1987 | Finger | 416/96 R |
| 5,252,026 A | 10/1993 | Shepherd | |
| 5,402,636 A | 4/1995 | Mize et al. | |
| 5,609,466 A * | 3/1997 | North et al. | 415/115 |
| 5,639,216 A * | 6/1997 | McLaurin et al. | 416/95 |
| 5,759,012 A | 6/1998 | Glezer et al. | |
| 6,077,035 A | 6/2000 | Walters et al. | |
| 6,089,822 A | 7/2000 | Fukuno | |
| 6,398,488 B1 * | 6/2002 | Solda et al. | 415/115 |
| 6,481,959 B1 | 11/2002 | Morris et al. | |
| 6,508,620 B2 * | 1/2003 | Sreekanth et al. | 415/115 |
| 6,722,138 B2 | 4/2004 | Soechting et al. | |
| 6,761,529 B2 | 7/2004 | Soechting et al. | |
| 6,945,749 B2 | 9/2005 | De Cardenas | |
| 2002/0098078 A1 | 7/2002 | Beeck et al. | |

FOREIGN PATENT DOCUMENTS

| | | |
|---|---|---|
| EP | 0937863 A | 8/1999 |
| WO | WO 03/006883 A | 1/2003 |

* cited by examiner

*Primary Examiner*—Igor Kershteyn
(74) *Attorney, Agent, or Firm*—Colin L. Cini

(57) ABSTRACT

In accordance with the present invention, there is provided a system for injecting a secondary fluid stream into a primary fluid stream with improved aerodynamic efficiency. The secondary fluid stream is injected into the primary fluid stream at a tangential angle and radial location that reduces both mixing and endwall losses. A platform borders the primary fluid stream and contains a trailing edge surface. A rail extends radially from the platform and one or more conduits enter the rail in a substantially radial direction. The conduits extend through the radial length of the rail, continue into the platform, and terminate at the trailing edge surface. The secondary fluid stream is conveyed by the conduits through the rail and the platform, to the trailing edge surface, for injecting into the primary fluid stream at an optimal angle and radial location.

6 Claims, 8 Drawing Sheets

FLUID INJECTION SYSTEM

BACKGROUND OF THE INVENTION (1) Field of the Invention

The present invention relates to gas turbine engines, and more specifically to systems and components for injecting a secondary fluid stream into a primary fluid stream with improved aerodynamic efficiency.

(2) Description of the Related Art

Gas turbine engines operate according to a continuous-flow Brayton cycle where ambient air is compressed, fuel is added, the fuel-air mixture is combusted, and the products of combustion are expanded through an annular duct in a turbine. Alternating stages of stationary turbine vanes and rotating turbine blades transfer the energy of the expanding gas in the duct to a shaft, which in turn powers a large diameter fan, a gearbox or a generator. The residual energy of combustion may be discharged from the engine as thrust. Gas turbine engines are frequently used to power aircraft, heavy-duty vehicles, ships and electrical generators.

Within a typical gas turbine engine, compressed ambient air is directed into two fluid streams: a primary and a secondary. The primary fluid stream is mixed with fuel and combusted, and the secondary fluid stream is used for cooling the vanes, blades and other critical components in the turbine. The secondary fluid stream is directed radially about the combustor and annular duct to cool the critical turbine components before being introduced into the primary fluid stream. The secondary fluid stream is radially introduced into the axially and tangentially directed primary fluid stream, which leads to aerodynamic mixing losses.

Aerodynamic losses in the primary fluid stream also occur at the juncture of vane and blade airfoils and the duct's peripheral endwalls. At the endwalls, the primary fluid stream is dominated by a vortical flow structure known as a horseshoe vortex. The vortex forms as a result of an endwall boundary layer, which separates from the endwall as the primary fluid stream approaches the leading edges of the airfoils. The separated stream reorganizes into a horseshoe vortex, which leads to an aerodynamic loss oftentimes referred to as "secondary" or "endwall" loss. Endwall loss attributes to as much as 30% of the loss in a row of airfoils. A further description of the horseshoe vortex, the associated fluid dynamic phenomena and geometries for reducing endwall losses can be found in U.S. Pat. No. 6,283,713 to Harvey, et al. and in Sauer et al., "Reduction of Secondary Flow Losses in Turbine Cascades by Leading Edge Modifications at the Endwall", ASME 2000-GT-0473.

In prior art reference U.S. Pat. No. 4,311,431 to Barbeau, tangentially angled holes in a shroud minimize undesirable air turbulence at a blade tip. In another reference, U.S. Pat. No. 6,481,959 to Morris, et al., ingestion-inhibiting jets below the platform prevent ingestion of the primary fluid stream into a radial gap. In additional references, U.S. Pat. No. 6,089,822 to Fukuno and U.S. Pat. No. 6,761,529 to Soechting, et al., plural trailing edge flow paths cool the trailing edge of the platform before being discharged at the trailing edge.

It is widely understood that minimization or elimination of aerodynamic losses in a turbine improves efficiency and greatly reduces fuel consumption. A commercial airline may spend up to 30% of its operating expenses on fuel, so any reduction in fuel consumption directly benefits the commercial airline industry as a whole. Although the benefits of the prior art systems are acknowledged, it is desirable to reduce both the mixing and endwall losses with a single injection system.

BRIEF SUMMARY OF THE INVENTION

In accordance with the present invention, there is provided a system for injecting a secondary fluid stream into a primary fluid stream with improved aerodynamic efficiency. The secondary fluid stream is injected into the primary fluid stream at a tangential angle that reduces mixing losses and at a radial location that reduces endwall losses. The system is very easily designed into new products or retrofitted into existing products.

In a preferred embodiment, a platform borders the primary fluid stream and contains a trailing edge surface. A rail extends radially from the platform and one or more conduits enter the rail in a substantially radial direction. The conduits extend through the radial length of the rail, continue into the platform, and terminate at the trailing edge surface. The secondary fluid stream is conveyed by the conduits through the rail and the platform, to the trailing edge surface, for injecting into the primary fluid stream.

The secondary fluid stream is injected in a parallel direction as the primary fluid stream, so the mixing losses are effectively reduced. Also, by discharging the secondary fluid stream from the trailing edge surface of the platform, which is radially aligned with the horseshoe vortex initiation area, the endwall losses are effectively reduced or eliminated altogether.

A primary advantage of the present fluid injection system is the reduction of both mixing and endwall losses over conventional systems due to the optimized positioning of the injection location.

Other details of an injection system according to the present invention, as well as other objects and advantages attendant thereto, are set forth in the following detailed description and the accompanying drawings wherein like reference numerals depict like elements.

DETAILED DESCRIPTION OF THE INVENTION

Figure 1:
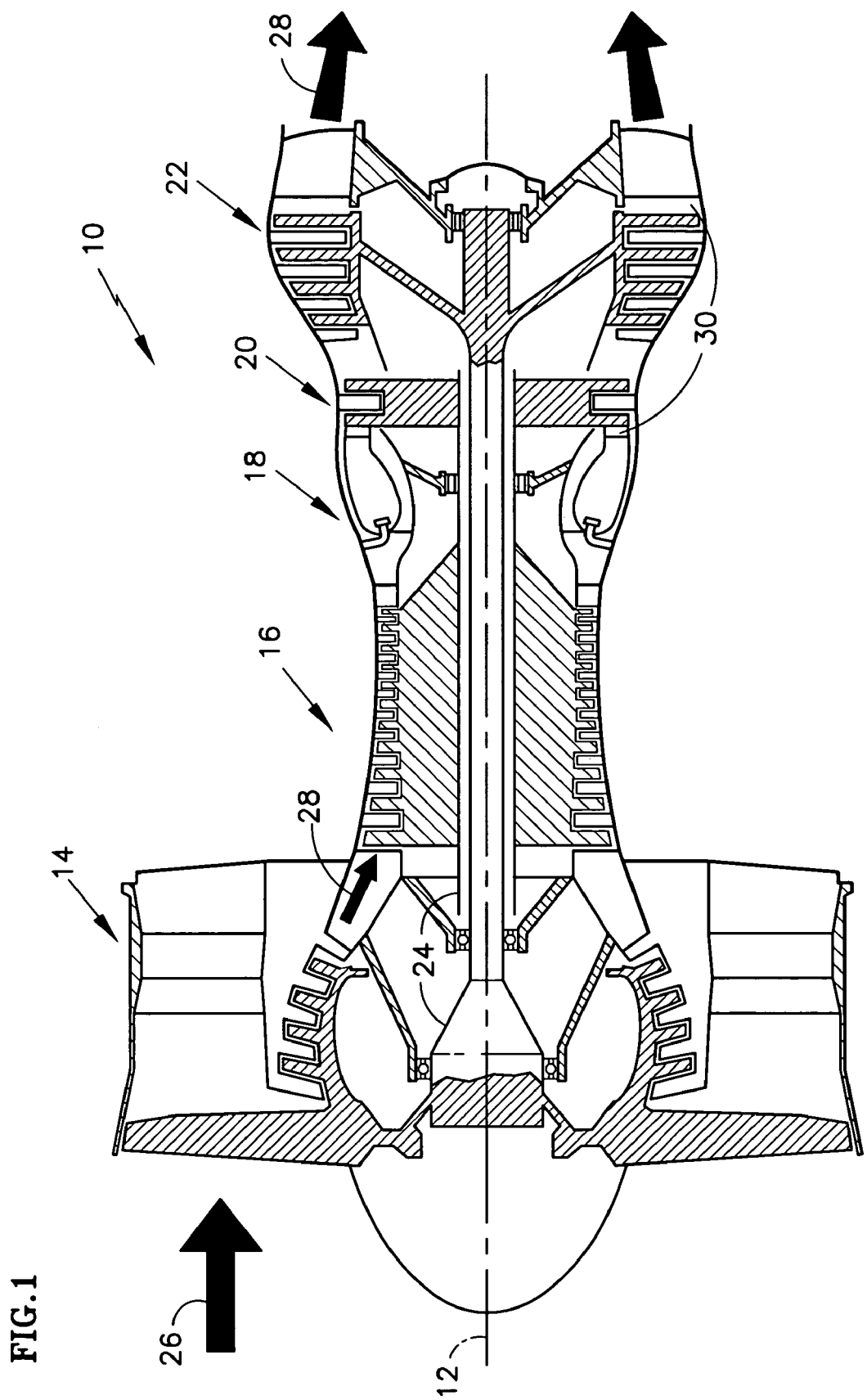
FIG. 1 is a simplified sectional view of a gas turbine engine of the type used in modern commercial aircraft.

Referring to FIG. 1, the major sections of an axial-flow gas turbine engine 10 include in series, from front to rear and disposed about a central longitudinal axis 12, a low-pressure compressor 14, a high-pressure compressor 16, a combustor 18, a high-pressure turbine 20 and a low-pressure turbine 22. Concentric shafts 24 located central to the engine 10 rotate about the axis 12 and connect the compressors 14, 16 to the turbines 22, 20, forming low and high spools respectively. Ambient air 26 enters the engine 10 and is directed axially rearward, as a primary fluid stream 28, through the compressors 14, 16. Once the primary fluid stream 28 is compressed, fuel is injected in a combustor 18 and the mixture is burned. The primary fluid stream 28 exits the combustor 18 at a very high temperature and expands within an annular duct 30 in the turbines 20, 22. Finally, the primary fluid stream 28 is expelled from the engine 10 as a propulsive thrust.

Figure 2:
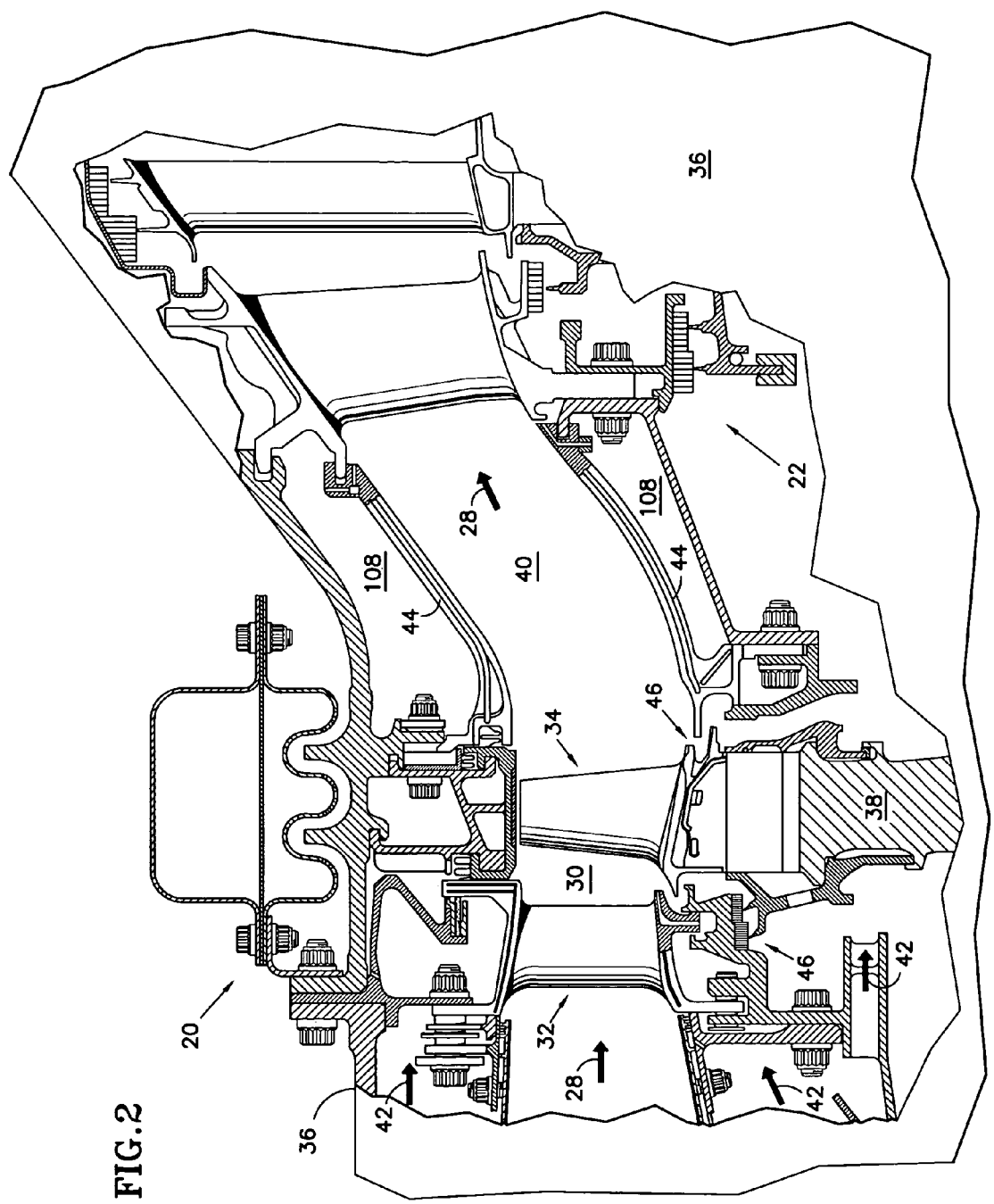
FIG. 2 is a partial sectional view of a high-pressure turbine and a low-pressure turbine of the type used in the gas turbine engine of FIG. 1.

Extending into the annular duct 30, as illustrated in FIG. 2, are alternating axial stages of circumferentially spaced vanes 32 and blades 34. The vanes 32 are cantilevered radially inwardly from a stationary casing structure 36, while the blades 34 extend radially outwardly from a rotor 38. An annular transition duct 40 bridges the radial expanse between the high and low-pressure turbines 20, 22. To prevent premature deterioration of critical components such as the vanes 32, blades 34 and transition ducts 40 due to the extreme temperature of the primary fluid stream 28, they are actively cooled with a lower temperature, secondary fluid stream 42.

The secondary fluid stream 42 is bled from the primary fluid stream 28 in the high-pressure compressor 16. The secondary fluid stream 28 is directed radially about the duct 30, to each of the critical components. The secondary fluid stream 42 is maintained at a higher pressure than the primary fluid stream 28 to ensure uninterrupted cooling over all operating conditions. Platforms 44 isolate the low-pressure primary fluid stream disposed inside the duct 30 from the high-pressure secondary fluid 42 disposed outside the duct 30. Despite the use of various types of duct seals 46 between the vanes 32 and blades 34, the secondary fluid stream 42 can leak into the annular duct 30, where it then rejoins the primary fluid stream 28.

Figure 3:
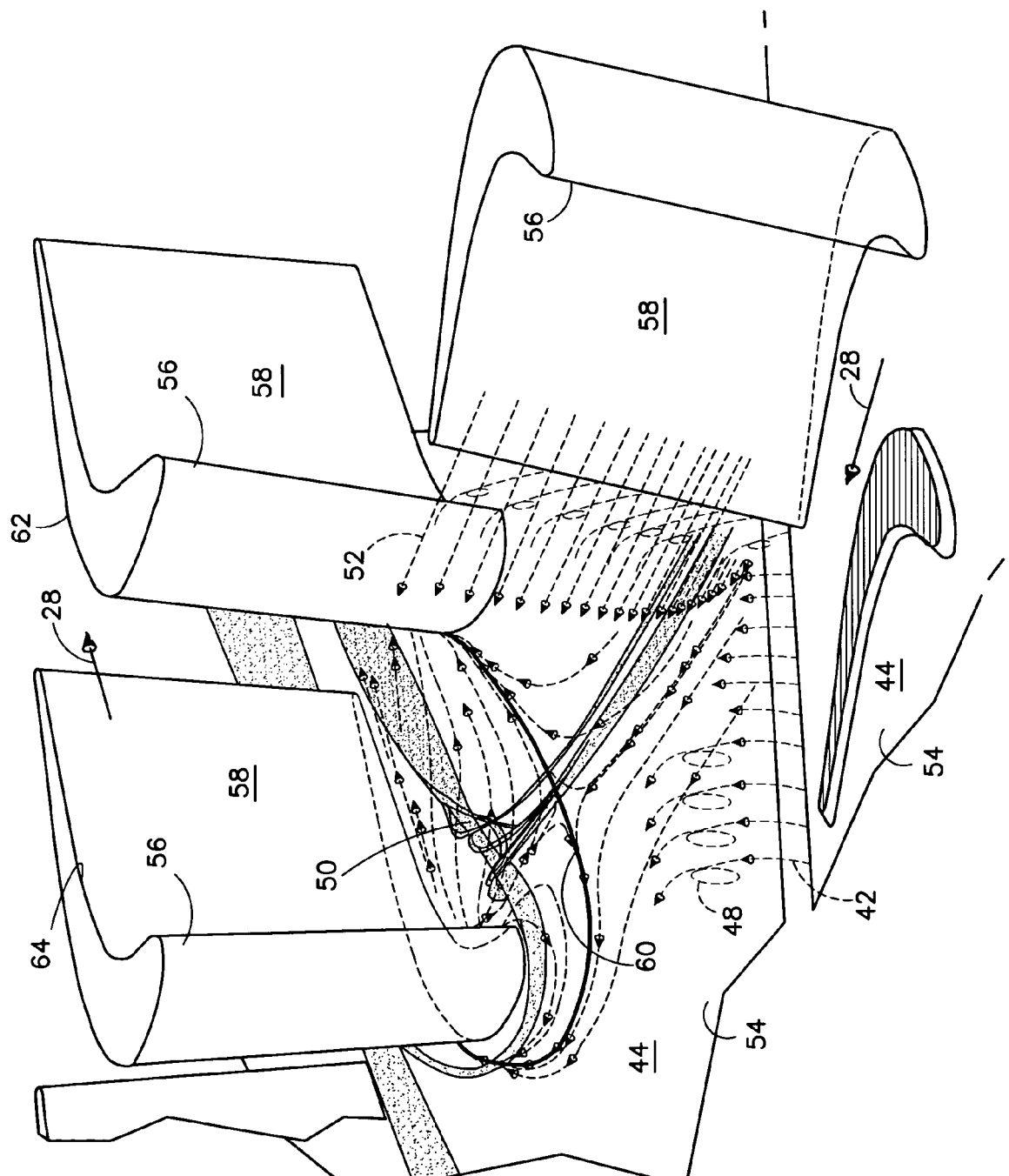
FIG. 3 is a perspective, schematic representation of mixing and endwall aerodynamic losses as they occur in the turbines of FIG. 2.

The primary fluid stream 28 is directed in a substantially axial and tangential direction as it expands through the vanes 32 and blades 34 as depicted in FIG. 3. The secondary fluid stream 42 rejoins the primary fluid stream 28 in a substantially radial direction. The mixing of the primary 28 and secondary 42 fluid streams creates turbulence 48, which causes mixing losses and reduces aerodynamic efficiency. In addition, a horseshoe vortex 50 forms as a result of the boundary layer 52 located at an endwall surface 54 of the platforms 44. The boundary layer 52 separates from the endwall surfaces 54 as the primary fluid stream 28 approaches a leading edge 56 of an airfoil 58. The primary fluid stream 28 separates along a line 60 and reorganizes into a horseshoe vortex 50. The horseshoe vortex 50 starts at the leading edges 56 of the airfoils 58 near the endwall surfaces 54. One leg follows closely to a suction surface 62 and another leg sweeps across a passage between adjacent airfoils 58 to a pressure surface 64 and mixes with other secondary flow structures in the vicinity of the suction surface 62 and endwall surface 54. Further aerodynamic losses result from the mixing of these vortices 50.

Figure 4:
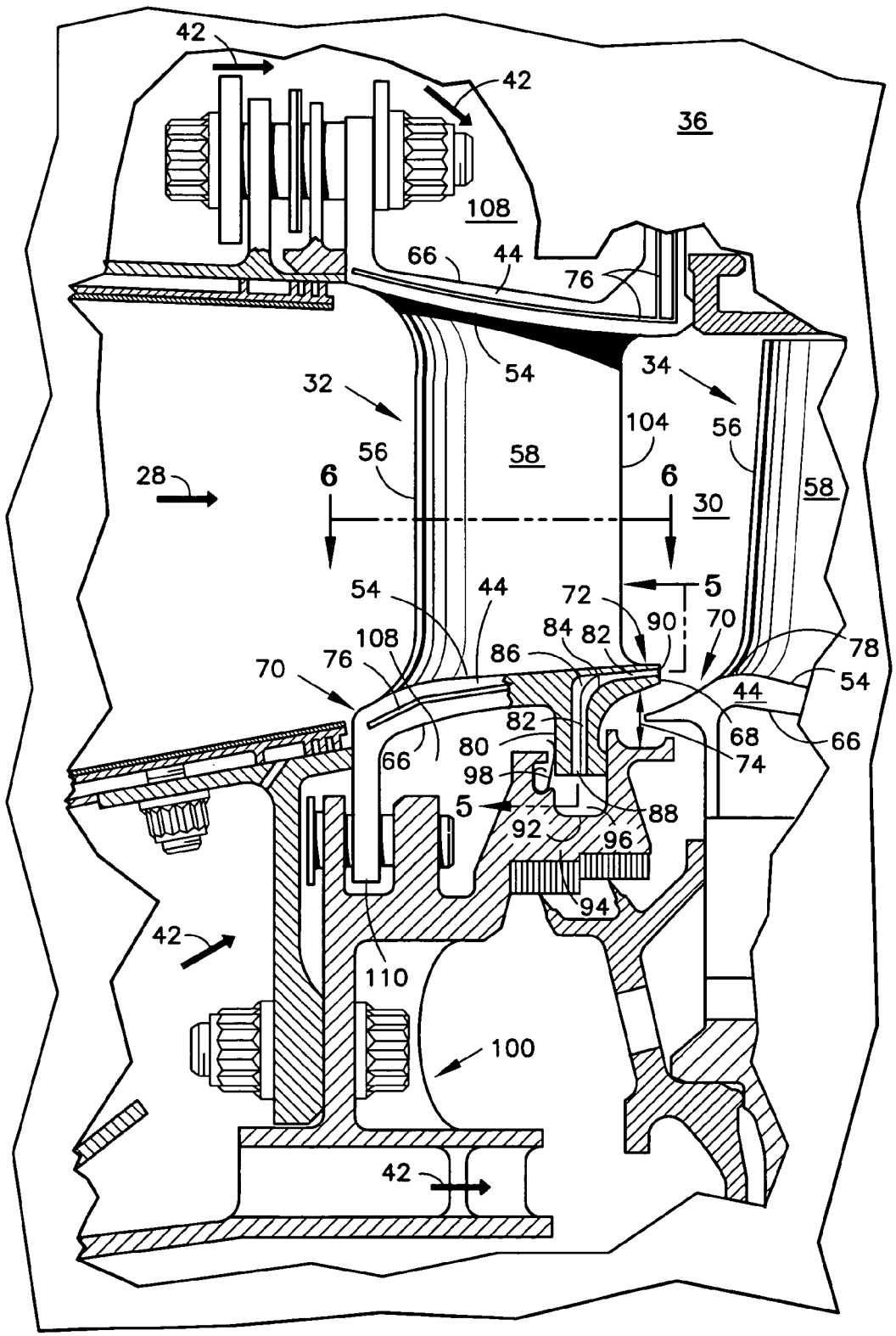
FIG. 4 is a detailed sectional view of a vane stage of the type used in the high-pressure turbine of FIG. 2.

Further details of the injection system are illustrated in FIG. 4. The vane 32 contains an airfoil 58 spanning radially between inner and outer platforms 44. Each platform 44 contains and endwall surface 54 exposed to the primary fluid stream 28, an unexposed surface 66, a trailing edge surface 68, and may also contain fore 70 and aft 72 extensions. A radial gap 74 exists between the fore 70 and aft 72 extensions of adjacent vane 32 and blade 34 stages to compensate for centrifugal growth of the rotor 38. The fore 70 and aft 72 extensions of adjacent vane 32 and blade 34 stages also overlap axially to discourage the primary fluid stream 28 from entering the gap 74. In most instances, vanes 32 are investment cast or machined in circumferential segments to reduce thermally induced stresses, with each segment containing one or more airfoils 58. Platform seals 76 disposed between the segments restrict leakage of the secondary fluid stream 42 into the duct 30. In limited instances, an entire vane 32 stage may be cast or machined as a unitary ring.

Disposed axially adjacent to the vane 32 may be a blade 34 with an airfoil 58 extending radially outwardly from a platform 44. The platform 44 contains an endwall surface 54 exposed to the primary fluid stream 28, an unexposed surface 66, a trailing edge surface 68, and may also contain fore 70 and aft 72 extensions. The airfoil 58 also contains a forward leading edge 56, which forms a juncture 78 with the platform 44. The horseshoe vortex 50 forms at the juncture 78 of the leading edge 56 and the platform 44 as previously described and illustrated in FIG. 3.

A rail 80 extends radially from the unexposed side 66 of the platform 44 for use in restraining the vane 32 during aerodynamic loading. The rail 80 also adds rigidity to prevent twisting of the platform 44 after extended use. One or more conduits 82 enter the rail 80 in a substantially radial direction; continue through the radial length of the rail 80, and then into the platform 44 in a substantially axial direction. The conduits 82 exit the platform 44 at the trailing edge surface 68, which is disposed radially above the radial gap 74. The trailing edge surface 68 may be planar, concave, convex, slotted or otherwise shaped. A radius portion 84 may be disposed in the conduit 82 to provide a smooth transition between the substantially radial portion in the rail 80 and the substantially axial portion in the platform 44. A manifold 86 may connect the one or more conduits 82 at a location disposed between an entrance 88 in the rail 80 and an exit 90 in the trailing edge surface 68.

Figure 5:
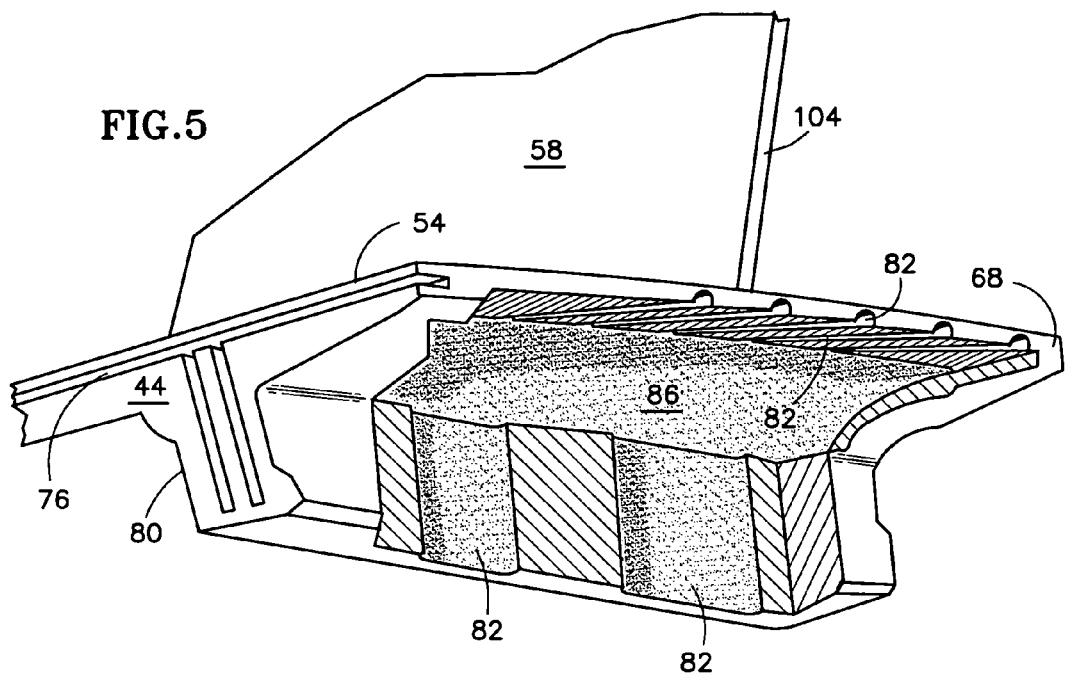
FIG. 5 is a perspective, partial sectional view of the vane of FIG. 4, taken along line 5-5.

The number of conduits 82 entering the rail 80 may be more or less than the number of conduits 82 exiting the trailing edge surface 68. In a preferred embodiment, the number entering the rail 80 is less than the number exiting the trailing edge surface 68. As best illustrated in FIG. 5, the conduits 82 entering the rail 80 are preferably racetrack shaped to fit within the rail 80 and reduce restriction. The conduits 82 exiting the trailing edge surface 68 are preferably circular, with a diameter of between 0.010 inch (0.254 mm) and 0.030 inch (0.762 mm). The conduits 82 and manifold 86 are preferably formed during the investment casting process, but may also be machined after casting by electrodischarge machining (EDM), laser drilling, conventional drilling or other suitable process.

As FIG. 4 illustrates, the rail 80 may be restrained within a channel 92 disposed in a support structure 94. A plenum 96 is formed between the rail 80 and the channel 92 for storing the secondary fluid stream 42. A spring seal 98 may be used to meter the secondary fluid stream 42 entering the plenum 96. Although the support structure 94 extends from a cooling duct 100 in the example shown, other structures may similarly be used as support.

Figure 6A:
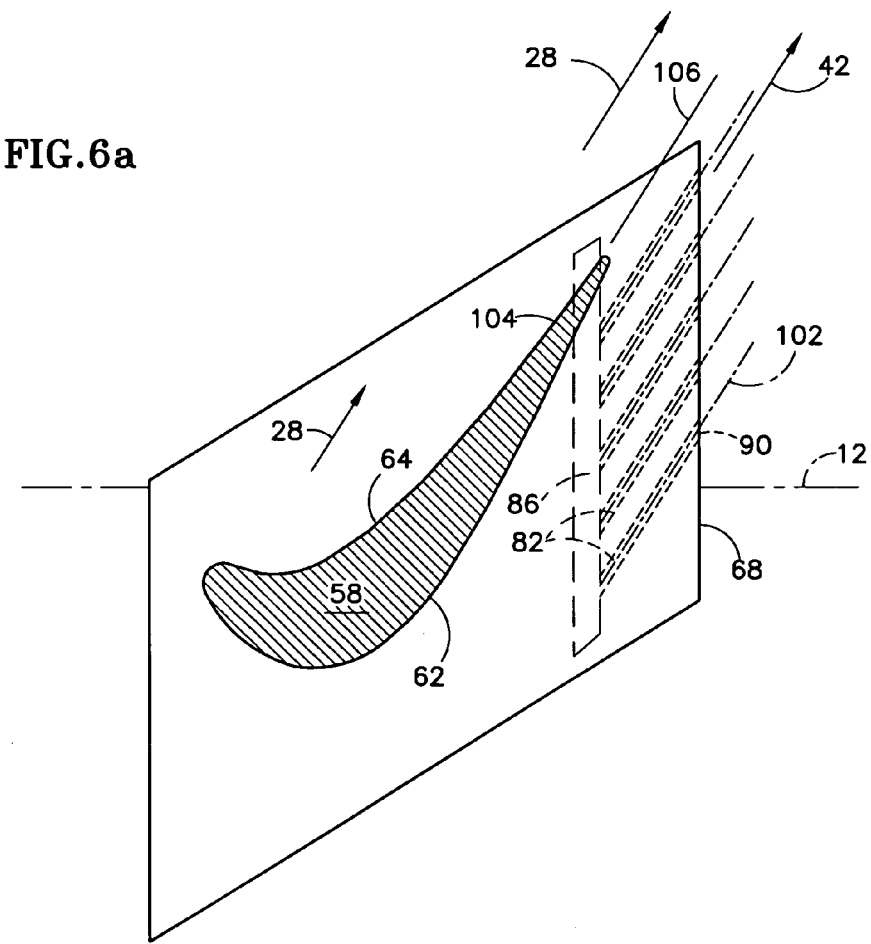
FIG. 6a is a top sectional view of the vane of FIG. 4, taken along line 5-5 and illustrating parallel apertures.

Referring now to FIG. 6a, the primary fluid stream 28 is directed by the trailing edge 104 at a tangential angle with respect to the engine axis 12. To the rear of the trailing edge 104, the primary fluid stream 28 continues in a direction parallel to a line 106 tangent to the trailing edge 104 when viewed in the radial direction. The orientation of a centerline 102 of the one or more conduits 82 exiting the trailing edge surface 68 is shown substantially aligned with the tangent line 106. By aligning the conduit exits 90 at the trailing edge surface 68 with the tangent line 106, the secondary fluid stream 42 is injected in the exact direction as the primary fluid stream 28 at the trailing edge portion 104. The alignment of the primary fluid stream 28 with the injected secondary fluid stream 42 minimizes turbulence 48, reducing the mixing losses and improving aerodynamic efficiency.

Figures 6B, 6C:
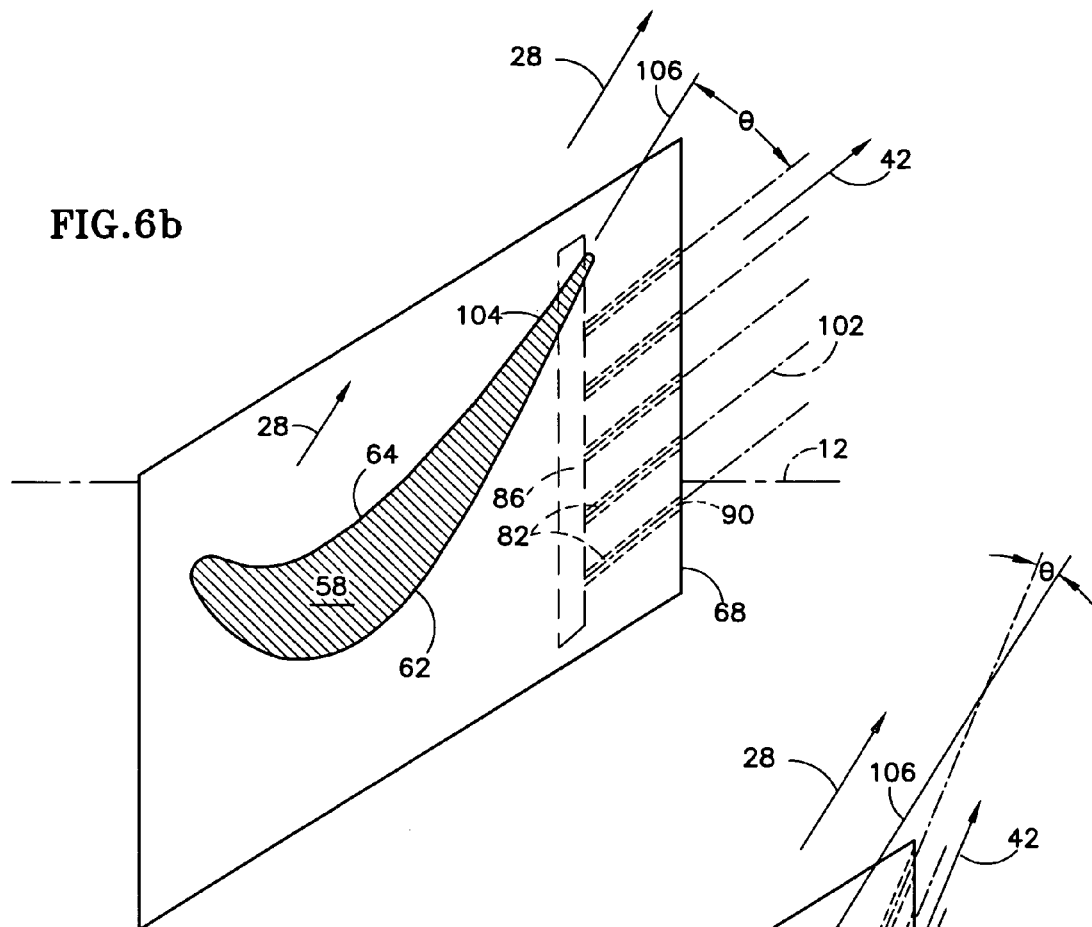
FIG. 6b is a top sectional view of the vane of FIG. 4, taken along line 5-5 and illustrating positively angled apertures.
FIG. 6c is a top sectional view of the vane of FIG. 4, taken along line 5-5 and illustrating negatively angled apertures.

The orientation of the centerline 102 of the one or more conduits 82 may also be angled in relation to the tangent line 106 when viewed in the radial direction. The angular orientation of the secondary fluid stream 42 can be directed at the juncture 78, where the downstream horseshoe vortices form, thus improving aerodynamic efficiency. The angle theta may be up to thirty degrees in the direction of the suction surface 62 (FIG. 6b) or up to thirty degrees in the direction of the pressure surface 64 (FIG. 6c) of the airfoil 58. By analyzing the individual mixing and endwall losses and iterating until the collective losses are minimized, one skilled in the art may determine the optimal angle theta. Computational Fluid Dynamics (CFD) may be used to model the mixing and endwall losses occurring simultaneously at the vane 32 to blade 34 interface for a particular engine configuration. A number of CFD models, with identical boundary conditions and varying angles theta, may be run in rapid succession. The angle theta that minimizes the collective mixing and endwall losses may then be further validated in a physical model.

Figure 7:
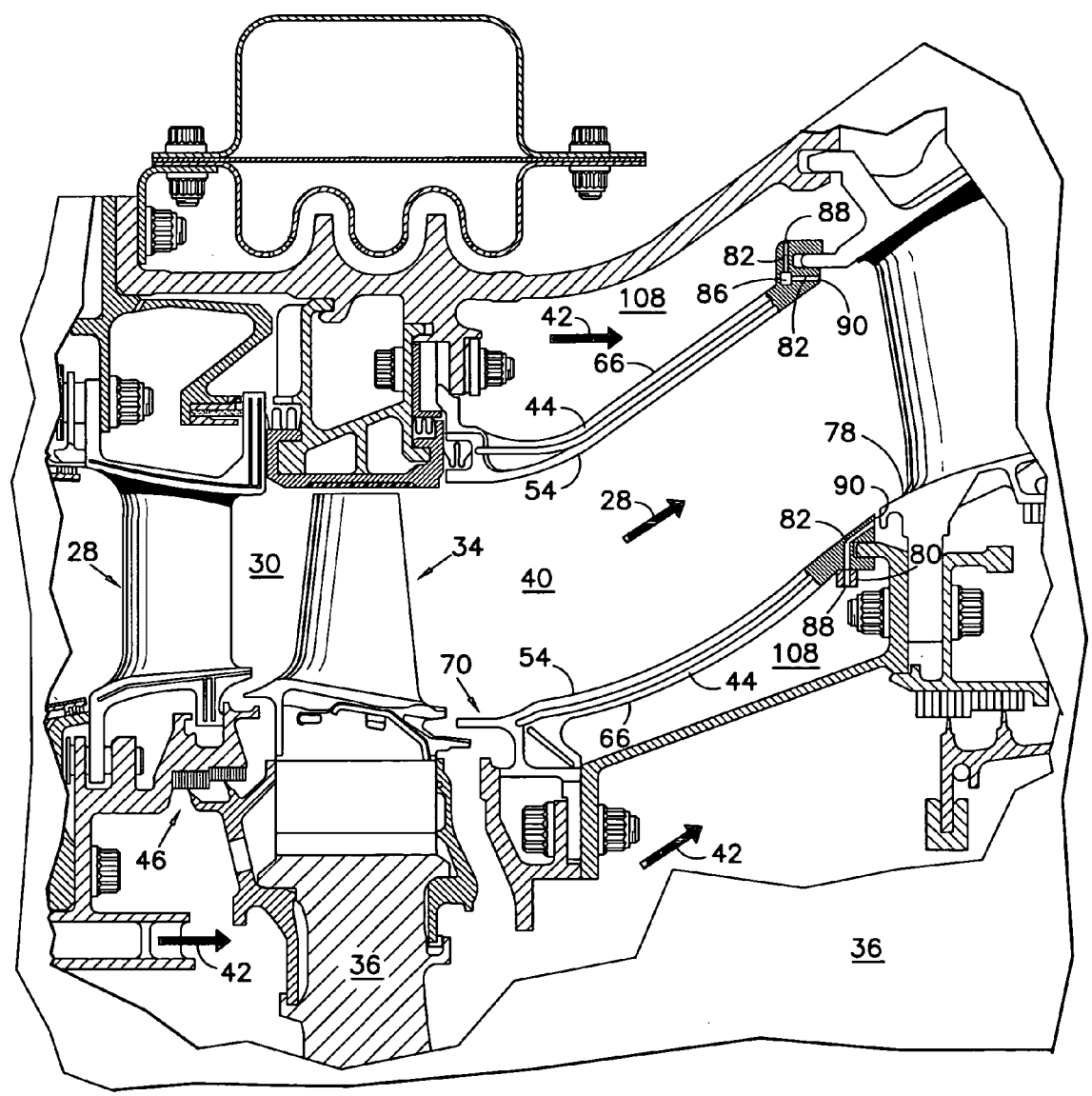
FIG. 7 is a detailed sectional view of a transition duct of the type used to span radially between the high-pressure turbine and the low-pressure turbine of FIG. 2.
Figure 8:
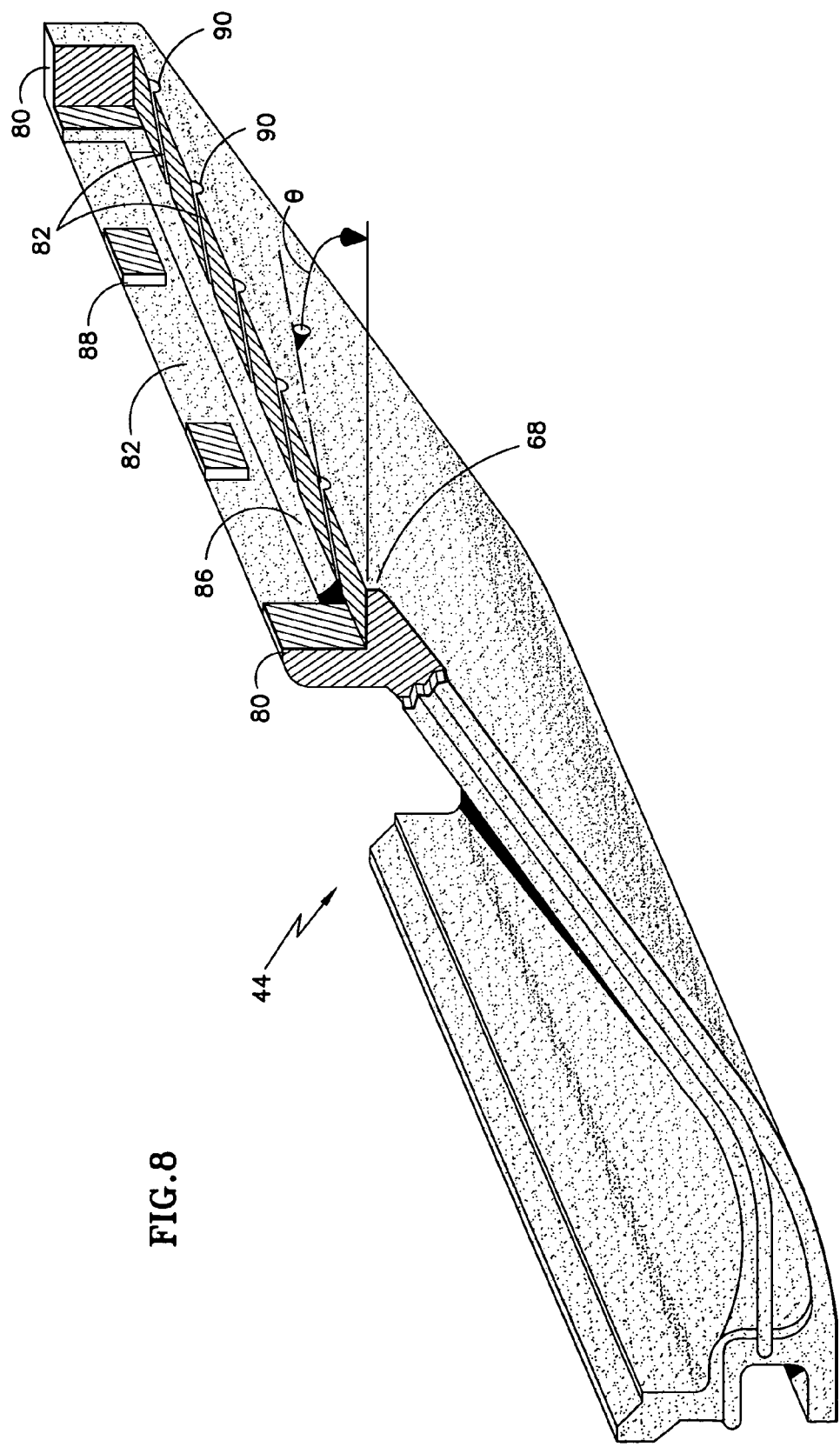
FIG. 8 is a perspective, partial sectional view of the transition duct of FIG. 7.

Platforms 44 may also be used to transition the primary fluid stream 28 between turbine components with differing radial locations. Illustrated in the example of FIGS. 7-8, is a transition duct 40 between a high-pressure turbine 20 and a low-pressure turbine 22. Each platform 44 contains and endwall surface 54 exposed to the primary fluid stream 28, an unexposed surface 66, a trailing edge surface 68, and may also contain fore 70 and aft 72 (not shown) extensions. In most instances, platforms 44 are cast in circumferential segments to reduce thermally induced stresses. Seals disposed between segments restrict leakage of the secondary fluid stream 42 into the transition duct 40. In limited instances, an entire transition duct 40 platform 44 may be cast of machined as a unitary ring.

Each of the previously described elements such as the rail 80, conduits 82, manifold 86, and support 94 may be similarly applied to the platforms 44 of the transition duct 40. As each of these elements are described in detail above, a duplicate description is excluded here for brevity.

The operation of the fluid injection system will now be further described. A secondary fluid stream 42 bypasses the combustor 18 and is directed radially inwardly or outwardly to annular cavities 108 adjacent the unexposed surface 66 of the platforms 44. Scalloped flanges 110 allow the secondary fluid stream 42 to enter the cavities 108 that are otherwise sealed. The secondary fluid stream 42 is directed from a cavity 108, or plenum 96 to an entrance 88 of the conduits 82 in the rail 80.

Once in the conduits 82, the secondary fluid stream 42 is directed substantially radially outwardly or inwardly through the rail 80, axially into the platform 44, eventually discharging from the exit 90 in the trailing edge surface 68. In some embodiments, the secondary fluid stream 42 is conveyed between conduits 82 by a manifold 86 disposed between the entrance 88 and the exit 90. The manifold 86 distributes the secondary fluid stream 42 uniformly between the conduits 86 before exiting the trailing edge surface 68.

The secondary fluid stream 42 exits the trailing edge surface 68, radially above the gap 74, in a direction parallel to or angled to the primary fluid stream 28 direction. The direction may be aligned in relation to a line 106 tangent to the trailing edge portion 104 of an airfoil 58 or may be aligned with the primary fluid stream 28 as it transitions between components such as the high and low-pressure turbines 20, 22. The direction may also be angled in relation to a line 106 tangent to the trailing edge portion 104 of an airfoil 58.

The secondary fluid stream 42 simultaneously exits the trailing edge surface 68 in the direction of the juncture 78 of the leading edge 56 and the platform 44 of the following blade 34 or vane 32 stage. The juncture 78 is where the horseshoe vortex 50 forms in the primary fluid stream 28. The secondary fluid stream 42 modifies the inlet boundary layer 52 and may be optimized to reduce the negative effects of the horseshoe vortex 50 on aerodynamic efficiency. The secondary fluid stream 42 exiting the rear of the vane platform will weaken the vortices when targeting the endwall separation. The secondary fluid stream 42 exiting the platform trailing edge may be in-line with the foil trailing edge up to fifteen degrees from the edge opening up on the pressure side of the foil.

Those skilled in the art will appreciate that a system for injecting a secondary fluid stream 42 into a primary fluid stream 28 with improved aerodynamic efficiency has been disclosed. Aerodynamic inefficiencies attributable to mixing and endwall losses are reduced with the implementation of the present invention. The optimal location and angular orientation of the conduits 82 exiting the trailing edge surface 68 are determined for a specific engine through the use of Computational Fluid Dynamics (CFD), and validated through physical models or experimental engine tests.

While the present invention has been described in the context of specific and preferred embodiments thereof, other alternatives, modifications and variations will become apparent to those skilled in the art having read the foregoing description. Accordingly, it is intended to embrace those alternatives, modifications and variations as fall within the broad scope of the appended claims.

What is claimed is:

1. A system for injecting a secondary fluid stream into a primary fluid stream, comprising:
   a first platform bordering the primary fluid stream, said first platform containing a trailing edge surface;
   a rail extending radially from said first platform;
   a support, said support containing a channel and wherein said rail is disposed in the channel, forming a plenum therebetween for storing the secondary fluid stream;
   one or more conduits open to the plenum, said one or more conduits entering substantially radially into said rail, continuing into said first platform, and terminating at said trailing edge surface; and
   wherein said conduits convey the secondary fluid stream from the plenum, through the rail and the first platform, to the trailing edge surface for injecting into the primary fluid stream.

2. The system of claim 1, further comprising:
   a manifold connecting said one or more conduits for conveying the secondary fluid stream between conduits.

3. The system of claim 2, wherein the number of conduits entering into said rail is less than the number of conduits terminating at said trailing edge surface.

4. The system of claim 1, further comprising:
an airfoil disposed in the primary fluid stream, said airfoil extending from the first platform and containing an airfoil trailing edge for directing the primary fluid stream; and wherein the secondary fluid stream is injected in the approximate direction of the primary fluid stream at the airfoil trailing edge.

5. The system of claim 1, further comprising:
an airfoil rearward of the trailing edge surface and disposed in the primary fluid stream, said airfoil extending radially from a second platform bordering the primary fluid stream, said airfoil containing a leading edge;
a juncture where the leading edge and the second platform merge, said juncture initiating a horseshoe vortex in the primary fluid stream; and
wherein the secondary fluid stream is injected towards the juncture, forming a confluence with the horseshoe vortex.

6. The system of claim 4 in combination with the system comprising:
an airfoil rearward of the trailing edge surface and disposed in the primary fluid stream, said airfoil extending radially from a second platform bordering the primary fluid stream, said airfoil containing a leading edge;
a juncture where the leading edge and the second platform merge, said juncture initiating a horseshoe vortex in the primary fluid stream; and
wherein the secondary fluid stream is injected towards the juncture, forming a confluence with the horseshoe vortex

* * * * *